United States Patent [19]
Takayanagi et al.

[11] Patent Number: 5,157,097
[45] Date of Patent: Oct. 20, 1992

[54] POLYAMIDE-IMIDE RESINS AND PRODUCTION THEREOF

[75] Inventors: Hiroshi Takayanagi, Kanagawa; Hirotoshi Katsuoka, Aichi; Hiromi Nakano, Kanagawa; Masumi Ookita, Kanagawa; Akihiro Yamaguchi, Kanagawa; Masahiko Asano, Kanagawa, all of Japan

[73] Assignee: Mitsui Toatsu Chemicals, Incorporated, Tokyo, Japan

[21] Appl. No.: 746,730

[22] Filed: Aug. 19, 1991

[30] Foreign Application Priority Data

Aug. 23, 1990 [JP] Japan .................................. 2-220032
Jan. 10, 1991 [JP] Japan ...................................... 3-1491

[51] Int. Cl.$^5$ .............................................. C08G 18/22
[52] U.S. Cl. ......................................... 528/51; 528/52; 528/57; 528/67; 528/73; 528/128; 528/173; 528/184; 528/185; 528/188; 528/208; 528/350
[58] Field of Search ...................... 528/51, 52, 57, 67, 528/73, 128, 173, 184, 185, 188, 208, 350

[56] References Cited

U.S. PATENT DOCUMENTS

| | | | |
|---|---|---|---|
| 3,939,029 | 2/1976 | Gilliam et al. | 156/331 |
| 4,291,149 | 9/1981 | Keske et al. | 528/188 |
| 4,348,513 | 9/1982 | Keske et al. | 528/188 |
| 4,755,585 | 7/1988 | Hanson et al. | 528/182 |

FOREIGN PATENT DOCUMENTS 62-156120  7/1987  Japan .
63-39616  8/1988  Japan .

*Primary Examiner*—Maurice J. Welsh
*Assistant Examiner*—Rachel Johnson
*Attorney, Agent, or Firm*—Burns, Doane, Swecker & Mathis

[57] ABSTRACT

Melt moldable polyamide-imide resins are disclosed which have a glass transition temperature ranging from 120° to 300° C. and have molecule ends blocked with an unsubstituted aromatic group or an aromatic group having a substituent not reactive with amines, isocyanates, carboxylic acids and dicarboxylic acid anhydrides.

15 Claims, No Drawings

POLYAMIDE-IMIDE RESINS AND PRODUCTION THEREOF

BACKGROUND OF THE INVENTION

1. Field of the Invention

The present invention relates to novel polyamide-imide resins and processes for the production thereof, and more particularly, to melt moldable aliphatic and aromatic polyamide-imide copolymers having high glass transition temperatures and good heat resistance and processes for the production thereof.

2. Description of the Related Art

In general, aromatic polyamide-imide resins have excellent mechanical characteristics and heat resistance. The aromatic polyamide-imide resins heretofore proposed are thermally unstable upon melt molding due to the small difference between the flow initiating temperature and the thermal decomposition initiating temperature, and further the fluidity when melted is so low that melt molding is difficult.

In order to solve such problems of aromatic polyamide-imide resins. Japanese Patent Publication No. 39616/1988 proposes preparing polyamide-imide copolymers by using diamines comprising 4 benzene nuclei or more connected through ether bonds so as to improve the moldability.

However, the starting material, i.e. particular aromatic diamines having 4 benzene nuclei or more, can not be commercially produced with ease. In addition, direct polymerization for producing such polymers requires a long reaction time at an elevated temperature and thereby, the industrial production is problematic. In view of the foregoing, the proposed wholly aromatic polyamide-imide polymers are not always satisfactory upon manufacturing commercially from a practical point of view.

On the other hand, polyamide-imide resins having an amine skeleton of aliphatic nature have a low glass transition temperature and the heat resistance is not satisfactory.

Further, U.S. Pat. No. 3,939,029 discloses that trimellitoyl chloride anhydride is reacted with an aliphatic diamine to prepare a polyamide acid, which is then heated and dehydrated to form an aliphatic, aromatic polyamide-imide resin. However, the reactivity of the aliphatic diamine with trimellitoyl chloride anhydride is so low that the product has only a low molecular weight, and thereby the product can be used as adhesives. However, the product does not have a molecular weight sufficiently high to produce molded articles.

U.S. Pat. Nos. 4,348,513 and 4,291,149 disclose a process for producing injection moldable polyamide-imide resins where tricarboxylic acid anhydride groups constituting the polyamide-imide polymer are regularly arranged such that the head to head and tail to tail are linked sequentially. There are proposed aliphatic aromatic polyamide-imide resins produced by the reaction of fully or partly acylated diamines, tricarboxylic acid anhydrides and diamines. Since free carboxylic acids and amines can not be fundamentally reacted with each other, an acylating agent such as acetic anhydride is used to effect the amidation. In the condensation of amidation, acetic acid and the like are formed and in the condensation of imidization, water is formed. It is necessary to remove the acetic acid, water and the like thus formed at a high temperature under reduced pressure. Since the process involves acylation, the operation becomes complicated.

For the purposes of solving drawbacks of the prior art, the present inventors have conducted research and found that polyamide-imide resins capable of at least partly solving the drawbacks, for example, the resins of higher heat resistance, can be obtained by blocking the ends of the polymer molecule with particular end blocking groups and further said polyamide-imide resin can be efficiently produced by reacting aromatic tricarboxylic acid anhydrides, diisocyanates, diamines and end blocking agents in the presence of alkali metal compounds as a catalyst in a dipolar aprotic solvent.

SUMMARY OF THE INVENTION

An object of the present invention is to provide new polyamide-imide resins having high glass transition temperatures.

Another object of the present invention is to provide new polyamide-imide resins having high heat resistance.

A further object of the present invention is to provide new polyamide-imide resins having a large temperature difference between the flow temperature and the heat decomposition temperature.

Still another object of the present invention is to provide new melt moldable polyamide-imide resins.

A still further object of the present invention is to provide practical and economical processes for producing the above-mentioned polyamide-imide resins.

According to a first aspect of the present invention, there is provided a melt moldable polyamide-imide resin which comprises 5–95 mole % of a structural unit of the formula (I - 1),

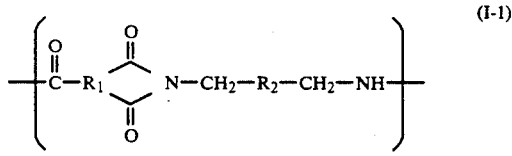

(I-1)

where $R_1$ is a trivalent aromatic ring of which two valence positions are at vicinal carbon atoms of the ring, $R_2$ is a direct bond or a divalent group containing at least one carbon atom, and 95–5 mole % of a structural unit of the formula (II),

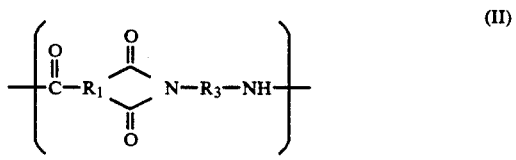

(II)

where $R_1$ is a trivalent aromatic ring of which two valence positions are at vicinal carbon atoms of the ring, and $R_3$ is a divalent aromatic group, the structural units of formula (I - 1) and formula (II) being bonded at random, the ends of the polymer molecule being blocked with a member selected from the group consisting of unsubstituted aromatic groups and aromatic groups which are substituted with a group not reactive with amines, isocyanates, carboxylic acids and dicarboxylic acid anhydrides, and the glass transition temperature of said resin being 120°–300° C.

According to a second aspect of the present invention, there is provided a melt moldable polyamide-imide resin which comprises a repeating unit of a controlled molecular arrangement of the formula (I - 2),

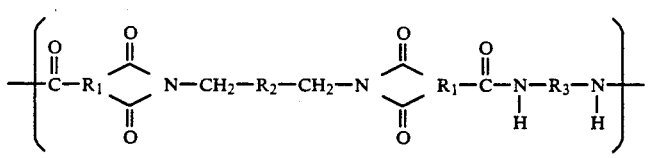

where $R_1$ is a trivalent aromatic ring of which two valence positions are at vicinal carbon atoms of the ring, $R_2$ is a direct bond or a divalent group containing at least one carbon atom, and $R_3$ is a divalent aromatic group, the ends of the polymer molecule being blocked with a member selected from the group consisting of unsubstituted aromatic groups and aromatic groups which are substituted with a group not reactive with amines, isocyanates, carboxylic acids and dicarboxylic acid anhydrides, and the glass transition temperature of said resin being 120°-300° C.

According to a third aspect of the present invention, there is provided a process for the production of a melt moldable polyamide-imide resin comprising 5-95 mole % of a structural unit of the formula (I - 1),

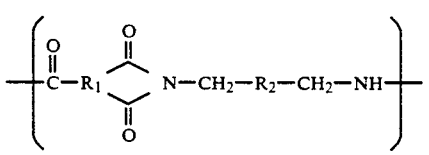

where $R_1$ is a trivalent aromatic ring of which two valence positions are at vicinal carbon atoms of the ring, $R_2$ is a direct bond or a divalent group containing at least one carbon atom, and 95-5 mole % of a structural unit of the formula (II),

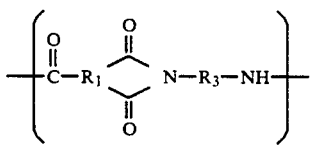

where $R_1$ is a trivalent aromatic ring of which two valence positions are at vicinal carbon atoms of the ring, and $R_3$ is a divalent aromatic group, the structural units of formula (I - 1) and formula (II) being bonded at random, the ends of the polymer molecule being blocked with a member selected from the group consisting of unsubstituted aromatic groups and aromatic groups which are substituted with a group not reactive with amines, isocyanates, carboxylic acids and dicarboxylic acid anhydrides, and the glass transition temperature of said resin being 120°-300° C., which comprises reacting an aromatic tricarboxylic acid anhydride of the formula (III),

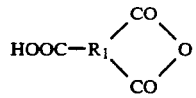

where $R_1$ is a trivalent aromatic ring of which two valence positions are at vicinal carbon atoms of the ring, an aliphatic or araliphatic diisocyanate of the formula (IV), $$OCN-CH_2-R_2-CH_2NCO \qquad (IV)$$

where $R_2$ is a direct bond or a divalent group containing at least one carbon atom, and an aromatic diisocyanate of the formula (V), $$OCN-R_3-NCO \qquad (V)$$

where $R_3$ is a divalent aromatic group, the molar amount of the aliphatic or araliphatic diisocyanate of the formula (IV) being 5-95 mole % based on the total molar amount of the aliphatic or araliphatic diisocyanate of the formula (IV) and the aromatic diisocyanate of the formula (V), and at least one end blocking agent selected from the group consisting of unsubstituted aromatic dicarboxylic acid anhydrides, aromatic dicarboxylic acid anhydrides substituted with a group not reactive with amines, isocyanates, carboxylic acids and dicarboxylic acid anhydrides, unsubstituted aromatic monocarboxylic acids, and aromatic monocarboxylic acids substituted with a group not reactive with amines, isocyanates, carboxylic acids and dicarboxylic acid anhydrides in an amount of 0.1 mole or less based on 1 mole of the aromatic tricarboxylic acid anhydride of the formula (III) in the presence of an alkali metal compound as a catalyst in a dipolar aprotic solvent at a temperature of 180° C. or higher.

According to a fourth aspect of the present invention, there is provided a process for the production of a melt moldable polyamide-imide resin comprising a repeating unit of a controlled molecular arrangement of the formula (I - 2),

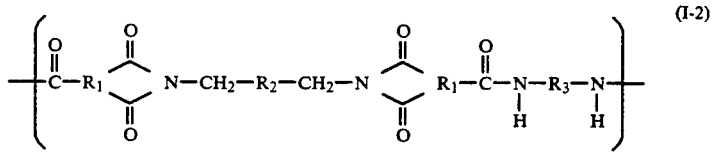

where $R_1$ is a trivalent aromatic ring of which two valence positions are at vicinal carbon atoms of the ring, $R_2$ is a direct bond or a divalent group containing at least one carbon atoms, and $R_3$ is a divalent aromatic group, the ends of the polymer molecule being blocked with a member selected from the group consisting of unsubstituted aromatic groups and aromatic groups which are substituted with a group not reactive with amines, isocyanates, carboxylic acids and dicarboxylic acid anhydrides, and the glass transition temperature of said resin being 120°–300° C. which comprises reacting one mole of an aromatic tricarboxylic acid anhydride of the formula (III),

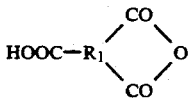
(III)

where $R_1$ is a trivalent aromatic ring of which two valence positions are at vicinal carbon atoms of the ring, 0.475–0.525 mole of an aliphatic or araliphatic diamine of the formula (VI), $$H_2N-CH_2-R_2-CH_2-NH_2 \quad (VI)$$

where $R_2$ is direct bond or a divalent group containing at least one carbon atom, and 0.1 mole of at least one end blocking agent selected from group consisting of unsubstituted aromatic dicarboxylic acid anhydrides, aromatic dicarboxylic acid anhydrides substituted with a group not reactive with amines, isocyanates, carboxylic acids and dicarboxylic acid anhydrides, unsubstituted aromatic monocarboxylic acids, and aromatic monocarboxylic acids substituted with a group not reactive with amines, isocyanates, carboxylic acids and dicarboxylic acid anhydrides, based on 1 mole of the aromatic tricarboxylic acid anhydride of the formula (III) in the presence of an alkali metal compound as a catalyst in a dipolar aprotic solvent at a temperature of 100° C. or higher, removing the water of condensation, then adding to the system 0.475–0.525 mole of an aromatic diisocyanate of the formula (V).

$$OCN-R_3-NCO \quad (V)$$

where $R_3$ is a divalent aromatic group and effecting the reaction at a temperature of 150° C. or higher.

According to the fifth aspect of the present invention, there is provided a process for the production of a melt moldable polyamide-imide resin which comprises a repeating unit of a controlled molecular arrangement of the formula (I - 2),

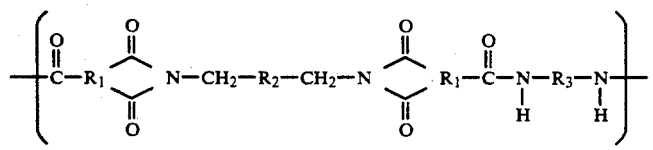
(I-2)

where $R_1$ is a trivalent aromatic ring of which two valence positions are at vicinal carbon atoms of the ring, $R_2$ is a direct bond or a divalent group containing at least one carbon atom, and $R_3$ is a divalent aromatic group, the ends of the polymer molecule being blocked with a member selected from the group consisting of unsubstituted aromatic groups and aromatic groups which are substituted with a group not reactive with amines, isocyanates, carboxylic acids and dicarboxylic acid anhydrides, and the glass transition temperature of said resin being 120°–300° C. which comprises reacting one mole of an aromatic tricarboxylic acid anhydride of the formula (III),

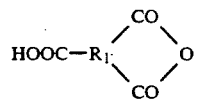
(III)

where $R_1$ is a trivalent aromatic ring of which two valence positions are at vicinal carbon atoms of the ring, 0.475–0.525 mole of an aliphatic or araliphatic diisocyanate of the formula (IV), $$OCN-CH_2-R_2-CH_2NCO \quad (IV)$$

where $R_2$ is a direct bond or a divalent group containing at least one carbon atom and 0.1 mole or less of at least one end blocking agent selected from the group consisting of unsubstituted aromatic dicarboxylic acid anhydrides, aromatic dicarboxylic acid anhydrides substituted with a group not reactive with amines, isocyanates, carboxylic acids and dicarboxylic acid anhydrides, unsubstituted aromatic monocarboxylic acids, and aromatic monocarboxylic acids substituted with a group not reactive with amines, isocyanates, carboxylic acids and dicarboxylic acid anhydrides, based on 1 mole of the aromatic tricarboxylic acid anhydride, of the formula (III) in the presence of an alkali metal compound as a catalyst in a dipolar aprotic solvent at a temperature of 100° C. or higher, then adding to the reaction product 0.475–0.525 mole of an aromatic diisocyanate of the formula (V), $$OCN-R_3-NCO \quad (V)$$

where $R_3$ is a divalent aromatic group and effecting the reaction at a temperature of 150° C. or higher.

In the present invention the amount of "0.1 mole of less" of the blocking agent excludes zero mole.

DESCRIPTION OF THE PREFERRED EMBODIMENTS

In the present invention, the substituent $R_1$ is a trivalent aromatic ring of which two valence positions are at vicinal carbon atoms of the ring.

Exemplary suitable trifunctional aromatic rings include trifunctional aromatic rings derived from benzene, naphthalene, diphenyl, diphenyl sulfone, diphenyl ether, benzophenone, perylene, diphenyl alkanes and the like. $R_1$ may be a trivalent group such as

where two valence positions are at vicinal carbon atoms.

The substituent $R_2$ is a direct bond or a divalent group containing at least one carbon atom. Exemplary suitable divalent groups containing at least one carbon atom include alkylene group, alkylene group containing in the main chain an element other than carbon, divalent aromatic groups such as phenylene, naphthylene and the like, and divalent groups derived from bicyclo compounds (bicyclic condensed ring compounds).

$R_2$ may be a divalent group such as

where n is an integer of 0–10.

The substituent $R_3$ is a divalent aromatic group. Exemplary suitable divalent aromatic groups include phenylene, substituted phenylene such as alkyl-substituted phenylene, alkoxy-substituted phenylene, halogen substituted phenylene and the like, and divalent aromatic groups derived from substituted or unsubstituted diphenyl alkane, triphenylalkane, diphenylsulfide, diphenylsulfone, diphenyl ether, benzophenone, diphenyl, naphthalene, anthraquinone, anthracene, azobenzene and the like.

$R_3$ may be a divalent group such as

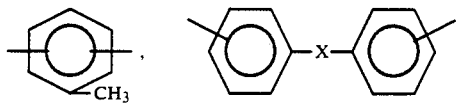

where X is a direct bond or a member selected from the group consisting of —$CH_2$—, —$SO_2$—, —SO—, —S—, —O—, and —CO—, and

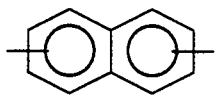

Exemplary suitable aromatic tricarboxylic acid anhydrides of the formula (III) above include benzene-1,2,4-tricarboxylic acid anhydride, naphthalene-1,2,4-tricarboxylic acid anhydride, naphthalene-1,2,5-tricarboxylic acid anhydride, naphthalene-2,3,5-tricarboxylic acid anhydride, naphthalene-2,3,6-tricarboxylic acid anhydride, 3,4,4'-diphenyl tricarboxylic acid anhydride, 2,3,2'-diphenyl tricarboxylic acid anhydride, 3,4,3'-diphenylsulfone tricarboxylic acid anhydride, 3,4,4'-diphenylether tricarboxylic acid anhydride, 3,4,4'-benzophenone tricarboxylic acid anhydride, 3,4,3'-benzophenone tricarboxylic acid anhydride, perylene-1,2,9-tricarboxylic acid anhydride, perylene-2,3,9-tricarboxylic acid anhydride, 2-(3,4-dicarboxyphenyl)-2-(3-carboxyphenyl)propane anhydride, 2-(2,3-dicarboxyphenyl)-2-(3-carboxyphenyl)propane anhydride, 1-(2,3-dicarboxyphenyl)-1-(3-carboxyphenyl)ethane anhydride, 1-(3,4-dicarboxyphenyl)-1-(4-carboxyphenyl)ethane anhydride, (2,3-dicarboxyphenyl)-(2-carboxyphenyl)methane anhydride and the like.

Exemplary suitable aliphatic or araliphatic diisocyanates of the formula (IV) above include aliphatic diisocyanate derivatives such as 1,2-diisocyanatoethane, 1,3-diisocyanatopropane, tetramethylene-1,4-diisocyanate, pentamethylene-1,5-diisocyanate, hexamethylene-1,6-diisocyanate, nonamethylene-1,9-diisocyanate, decamethylene-1,10-diisocyanate, ω,ω'-dipropylether diisocyanate, and the like, aromatic diisocyanates having the isocyanato groups at the side chain such as meta-xylylene diisocyanate, para-xylylene diisocyanate, and the like, and bicyclo compounds (bicyclic condensed ring compounds) such as 2,4-diisocyanatomethyl bicyclo[2,2,1]heptane, 2,5-diisocyanatomethyl bicyclo[2,2,1]heptane and the like.

In particular, hexamethylene-1,6-diisocyanate and meta-xylylene diisocyanate are preferable since they are commercially available and inexpensive.

Exemplary suitable aromatic diisocyanates of the formula (V) above include phenylene-1,3-diisocyanate, phenylene-1,4-diisocyanate, tolylene-2,6-diisocyanate, tolylene-2,4-diisocyanate, 1-methoxybenzene-2,4-diisocyanate, 1-chlorophenylene diisocyanate, tetrachlorophenylene diisocyanate, meta-xylylene diisocyanate, para-xylylene diisocyanate, diphenylmethane-4,4'-diisocyanate, diphenylsulfide-4,4'-diisocyanate, diphenylsulfone-4,4'-diisocyanate, diphenylether-4,4'-diisocyanate, diphenylether-3,4'-diisocyanate, diphenylketone-4,4'-diisocyanate, naphthalene-2,6-diisocyanate, naphthalene-1,4-diisocyanate, naphthalene-1,5-diisocyanate, 2,4'-biphenyl diisocyanate, 4,4'-biphenyl diisocyanate, 3,3'-methoxy-4,4'-biphenyl diisocyanate, anthraquinone-2,6-diisocyanate, triphenylmethane-4,4'-diisocyanate, azobenzene-4,4'-diisocyanate, and the like.

In particular, tolylene-2,4-diisocyanate, diphenylmethane-4,4'-diisocyanate and naphthalene-1,5-diisocyanate are preferable since they are commercially available and inexpensive.

Exemplary suitable aliphatic or araliphatic diamines of the formula (VI) above include aliphatic diamine derivatives such as 1,2-diaminoethane, 1,3-diaminopropane, tetramethylene-1,4-diamine, pentamethylene-1,5-diamine, hexamethylene-1,6-diamine, nonamethylene-1,9-diamine, decamethylene-1,10-diamine, ω,ω'-dipropylether diamine, and the like, and aromatic group-containing aliphatic diamines having amino groups at the side chains of the aromatic nucleus(es) such as meta-xylylenediamine, para-xylylenediamine, and the like, and bicyclo compounds (bicyclic condensed ring compounds) such as 2,4-diaminomethyl bicyclo[2,2,1]heptane, 2,5-diaminomethyl bicyclo[2,2,1]heptane and the like.

In particular, hexamethylene-1,6-diamine and metaxylylenediamine are preferable since they are commercially available and inexpensive.

The molecular end blocking group for the polymer used in the present invention is an unsubstituted aromatic group or an aromatic group having at least one substituent not reactive with amines, isocyanates, carboxylic acids and dicarboxylic acid anhydrides.

The aromatic group may be a monocyclic aromatic group, a condensed polycyclic aromatic group, or a polycyclic aromatic group of which aromatic rings are directly bonded or linked with a bridge member.

Exemplary suitable molecular end blocking groups include difunctional or monofunctional unsubstituted aromatic groups such as said groups derived from benzene, diphenylalkane, diphenyl sulfone, diphenyl sulfoxide, diphenyl sulfide, diphenyl ether, benzophenone and the like; and the above-mentioned groups substituted with alkyl, alkoxy or halogen such as methyl, methoxy or chloro-substituted aromatic group.

In particular, an unsubstituted aromatic group derived from benzene is preferable since the heat resistance of the polyamide-imide resin is improved when the ends of the polymer molecule are blocked with said group.

The end blocking agents for blocking the ends of the polymers used in the present invention are compounds having an unsubstituted aromatic group or an aromatic group having at least one substituent not reactive with amines, isocyanates, carboxylic acids and dicarboxylic acid anhydries.

The aromatic group may be a monocyclic aromatic group, a condensed polycyclic aromatic group, or a polycyclic aromatic group of which aromatic rings are directly bonded or linked with a bridge member.

Exemplary suitable end blocking agents include dicarboxylic acid anhydrides such as phthalic anhydride, 2,3-dicarboxyphenyl methane anhydride, 3,4-dicarboxyphenylmethane anhydride, 2,3-dicarboxyphenyl phenyl sulfone anhydride, 3,4-dicarboxyphenyl phenyl sulfone anhydride, 2,3-dicarboxyphenyl phenyl sulfoxide anhydride, 3,4-dicarboxyphenyl phenyl sulfoxide anhydride, 2,3-dicarboxyphenyl phenyl sulfide anhydride, 3,4-dicarboxyphenyl phenyl sulfide anhydride, 2,3-dicarboxyphenyl phenyl ether anhydride, 3,4-dicarboxyphenyl phenyl ether anhydride, 2,3-benzophenone dicarboxylic acid anhydride, 3,4-benzophenone dicarboxylic acid anhydride, 2,3-biphenyl dicarboxylic acid anhydride, 3,4-biphenyl dicarboxylic acid anhydride, 1,2-naphthalene dicarboxylic acid anhydride, 2,3-naphthalene dicarboxylic acid anhydride, 1,2-anthracene dicarboxylic acid anhydride, 2,3-anthracene dicarboxylic acid anhydride, and the like, alkyl-, alkoxy- or halo-substituted dicarboxylic acid anhydrides as mentioned above such as 4-methylphthalic anhydride, 4-methoxyphthalic anhydride, 4-chlorophthalic anhydride, and the like, and monocarboxylic acids such as benzoic acid, diphenylmethane carboxylic acid, diphenylsulfone carboxylic acid, diphenylsulfoxide carboxylic acid, diphenylsulfide carboxylic acid, diphenyl ether carboxylic acid, benzophenone carboxylic acid, biphenyl carboxylic acid, naphthalene carboxylic acid, anthracene carboxylic acid, and the like, and alkyl-, alkoxy-, or halogen-substituted monocarboxylic acids as mentioned above, and the like.

There are preferably used the following dicarboxylic acid anhydrides,

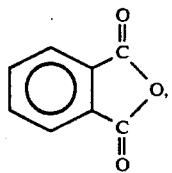

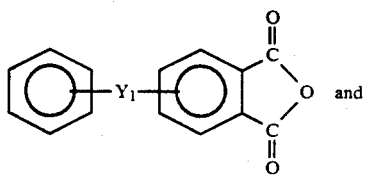

-continued

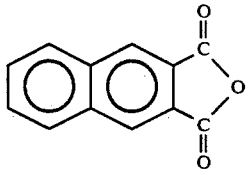

where $Y_1$ is a direct bond or a member selected from the group consisting of —$CH_2$—, —$SO_2$—, —SO—, —S—, —O— and —CO—, and monocarboxylic acids,

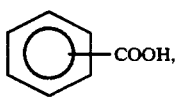

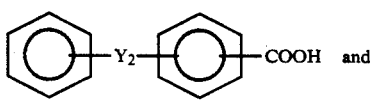

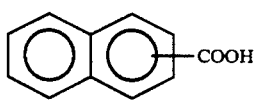

where $Y_2$ is a direct bond or a member selected from the group consisting of —$CH_2$—, —$SO_2$—, —SO—, —S—, —O—, and —CO—, and the dicarboxylic acids and monocarboxylic acids substituted with at least one substituent not reactive with amines, isocyanates, carboxylic acids and dicarboxylic acid anhydrides. It will be apparent to those of ordinary skill in the art that the described reactants for forming the resin in the various aspects of the invention include isomers. Unless otherwise stated, the description of the reactants includes all of such isomers.

In particular, phthalic anhydride and benzoic acid are more preferable since these are commercially available and inexpensive and the polyamide-imide resins blocked with those blocking agents have an excellent thermal stability.

Exemplary suitable alkaline metal compounds used as a catalyst include alkali metal salts of polybasic carboxylic acids such as mono-, di-, tri-, and tetra- lithium, sodium, potassium, rubidium, cesium, francium salts and the like of dicarboxylic acids, tricarboxylic acids and tetracarboxylic acids and the like, alkali metal carbonates such as lithium carbonate, sodium carbonate, potassium carbonate, rubidium carbonate, cesium carbonate, francium carbonate and the like, alkali metal hydrogen carbonates such as lithium hydrogen carbonate, sodium hydrogen carbonate, potassium hydrogen carbonate, rubidium hydrogen carbonate, cesium hydrogen carbonate, francium hydrogen carbonate and the like, alkali metal hydroxides such as lithium hydroxide, sodium hydroxide, potassium hydroxide, rubidium hydroxide, cesium hydroxide, francium hydroxide and the like, and alkali metal fluorides such as lithium fluoride, sodium fluoride, potassium fluoride, rubidium fluoride, cesium fluoride, francium fluoride and the like.

In particular, the sodium salts and potassium salts are preferable.

The alkali metal compounds may be used alone or in combination.

Exemplary suitable dipolar aprotic solvents used in the present invention include acyclic or cyclic amides such as N,N-dimethylacetamide, N,N-dimethylformamide, N-methylpyrrolidone, γ-butyrolactone, hexamethyl phosphoric acid triamide and the like, phosphorylamides, sulfoxides and sulfones such as dimethylsulfoxide, diphenylsulfone, tetramethylenesulfone and the like, and ureas such as tetramethylurea, N,N'-dimethylethyleneurea and the like.

When diisocyanates are used, it is preferable to use these solvents under substantially anhydrous conditions.

Other solvents which are inert to the polymerization reaction such as benzene, toluene, xylene and the like may be used together with the dipolar aprotic solvents as above.

According to the third aspect of the present invention, there may be produced a melt moldable polyamide-imide resin having excellent heat resistance as shown below.

A mixture of aromatic tricarboxylic acid anhydride (III), aliphatic or araliphatic diisocyanate (IV), aromatic diisocyanate (V), and an end blocking agent is heated to a temperature of 180° C. or higher in the presence of an alkali metal compound in a dipolar aprotic solvent to carry out the reaction.

The molar amount of aliphatic or araliphatic diisocyanate (IV) which may be used alone or as a mixture of aliphatic or araliphatic diisocyanates (IV) is 5-95 mole %, preferably 20-80 mole % based on the total molar amount of aliphatic or araliphatic diisocyanate (IV) and aromatic diisocyanate (V), and the molar amount of aromatic diisocyanate (V) is the balance in the combination of aliphatic or araliphatic diisocyanate (IV) and aromatic diisocyanate (V).

The molar amount of the end blocking agent is 0.1 mole or less based on one mole of aromatic tricarboxylic acid anhydride (III).

When the amount of the aliphatic or araliphatic diisocyanate is less than 5 mole % and the amount of the aromatic diisocyanate exceeds 95 mole %, melt viscosity of the resulting polymer increases and melt molding becomes difficult.

When the amount of the aliphatic or araliphatic diisocyanate exceeds 95 mole % and the amount of the aromatic diisocyanate is less than 5 mole %, glass transition temperature and heat resistance are lowered.

In particular, by using aliphatic or araliphatic diisocyanate (IV) and aromatic diisocyanate (V) in the above-mentioned molar amount ratio, there can be produced polyamide-imide resins having a glass transition temperature of 120°-300° C., excellent heat resistance and melt moldable melt viscosity.

The polymerization for producing the polyamide-imide resins of the present invention may be carried out by dissolving the aromatic tricarboxylic acid anhydride and the catalyst for polymerization in the dipolar aprotic solvent, adding the aliphatic or araliphatic diisocyanate, the aromatic diisocyanate, and the end blocking agent to the resulting solution and heating the mixture thus formed.

The reactivity of the aliphatic or araliphatic diisocyanate is so low that the polycondensation reaction is usually carried out at a temperature of 180° C. or higher, preferably at a temperature range of from 200° C. to 260° C.

The reaction time is usually 1-20 hours, and the time at which the generation of carbon dioxide, a by-product, is not observed any more, may be recognized as the end point of the reaction.

With respect to addition of both diisocyanates, the aliphatic or araliphatic diisocyanate and the aromatic diisocyanate may be mixed in advance and then added to the solution of the aromatic tricarboxylic acid anhydride.

Alternatively, the aliphatic or araliphatic diisocyanate and the aromatic diisocyanate may be separately added to the solution of the aromatic tricarboxylic acid anhydride and the order of addition is not critical.

The amount of the diisocyanates is preferably 70-130 moles, more preferably 90-115 moles per 100 moles of the aromatic tricarboxylic acid anhydride.

When the amount of the diisocyanates is lower than 70 moles or exceeds 130 moles, the molecular weight of the resulting polymer is low and the heat resistance is lowered.

The amount of the alkali metal compound is preferably 0.5-20 mole %, more preferably 1.0-10 mole % based on the aromatic tricarboxylic acid anhydride.

The concentration of the starting monomers (the aromatic tricarboxylic acid anhydride plus both diisocyanates) at the beginning of the polymerization reaction is, in general, in the range of 50-400 g per liter of the solvent.

The concentration is selected depending upon the reactivity of the starting monomers and the solubility of the resulting polymer in the polymerization solvent.

When the polymerization starts at a high concentration, a solvent is continuously or batchwise added to the reaction fluid, if necessary, so that any trouble of agitation due to the increased viscosity of the reaction fluid may be prevented during the polymerization.

According to the 4th or 5th aspect of the present invention, the melt moldable aliphatic aromatic polyamide-imide resins having a controlled molecular arrangement may be produced by a two-step process.

In the first step, one mole of the aromatic tricarboxylic acid anhydride (III), 0.475-0.525 mole, preferably 0.49-0.51 mole of the aliphatic or araliphatic diamine (VI) or the aliphatic or araliphatic diisocyanate (IV) and 0.1 mole or less of the end blocking agent per mole of the aromatic tricarboxylic acid anhydride may be heated to 100° C. or higher in a dipolar aprotic solvent in the presence of an alkali metal compound to carry out imidization, and the resulting condensation water is removed from the system when the aliphatic or araliphatic diamine is used.

Then at the second step, 0.475-0.525 mole, preferably 0.49-0.51 mole of the aromatic diisocyanate (V) per mole of the aromatic tricarboxylic acid anhydride may be added to the reaction fluid obtained at the first stage and heated to a temperature of 150° C. or higher to carry out amidation.

The amount of the aliphatic or araliphatic diamine (VI) or the aliphatic or araliphatic diisocyanate (IV) is 0.475-0.525 mole, preferably 0.49-0.51 mole per mole of the aromatic tricarboxylic acid anhydride (III).

When the amount of the diamine (VI) or the diisocyanate (IV) is less than 0.475 mole or more than 0.525 mole, the yield of the intermediate product, a diimide dicarboxylic acid, is lowered.

The amount of the aromatic diisocyanate (V) is 0.475-0.525 mole, preferably 0.49-0.51 mole per mole of the aromatic tricarboxylic acid anhydride (III).

When the amount of the aromatic diisocyanate (V) is less than 0.475 mole or more than 0.525 mole, the molecular weight of the polymer product is low.

The amount of the end blocking agent is 0.1 mole or less, preferably 0.08 mole or less per mole of the aromatic tricarboxylic acid anhydride. When the amount of the end blocking agent exceeds 0.1 mole per mole of the aromatic tricarboxylic acid anhydride, molecular weight of the resulting polymer is low and the heat resistance is also low.

Since the reactivity between the anhydride ring and the diamine (VI) is relatively high, the imidizing reaction to condense the aromatic tricarboxylic acid anhydride with the diamine (VI) is usually carried out at a temperature of 100° C. or higher, preferably, 150°-250° C.

The intermediate product, diimide dicarboxylic acid may be directly reacted with the aromatic diisocyanate without isolation to effect the polycondensation reaction (amidation), but the diimide dicarboxylic acid may be isolated and then used for effecting the polycondensation.

The polycondensation (amidation) is usually effect at a temperature of 150° C. or higher, preferably 200°-260° C. since the reactivity of the aromatic diisocyanate is low. With respect to another imidizing reaction, that is, the reaction of the aromatic tricarboxylic acid anhydride with the aliphatic or araliphatic diisocyanate (IV), the reactivity of the anhydride ring and that of the carboxyl group with the aliphatic and aromatic diisocyanates were investigated using phthalic anhydride and benzoic acid as model compounds. It has been found that the reaction of aliphatic or araliphatic diisocyanate with the anhydride ring (imidization) and that of the aliphatic or araliphatic diisocyanate with the carboxyl group (amidation) are largely different from each other in the imidization reaction rate and the amidation reaction rate at a temperature range of 100°-250° C.

In the first step, i.e. the imidization reaction, it is desired that the temperature is 100°-250° C., preferably 140°-180° C. When the temperature is lower than 100° C., the reactivity between the anhydride ring and the diisocyanate is lowered. When it is higher than 250° C., the amidation velocity becomes too fast to obtain the polymer having a controlled molecular arrangement.

At the second step, the amidation reaction, since the reactivity of the diisocyanate is low, it is desired that the temperature is 150° C. or higher, preferably 200°-260° C.

The intermediate product, a diimide dicarboxylic acid may be used directly without isolation to effect the polycondensation (amidation) with the diisocyanate, but the intermediate product may be isolated and then used for the polycondensation (amidation).

What is meant by "polyamide-imide resin of a controlled molecular arrangement" is that the diimide units formed in the first step which face each other are arranged regularly by way of the amide bonds formed in the amidation reaction in the second step.

The reaction time is usually 1-20 hours in each of the imidization and the amidation steps. The time when the generation of water and carbon dioxide is not observed substantially may be regarded as the time of completion of the reaction.

The amount of the alkali metal compound to be used is preferably 0.5-20 mole %, more preferably 1.0-10 mole % based on the aromatic tricarboxylic acid anhydride.

In general, the concentration of the starting monomers [aromatic tricarboxylic acid anhydride+diamine (or diisocyanate of the first step)+diisocyanate of the second step] is 50-400 g/liter. The selection of the concentration depends on the reactivity of each of the starting monomers and the solubility of the resulting polymer in the polymerization solvent and the like.

When the polymerization starts at a high concentration of the monomers, it is preferable to add a solvent continuously or batchwise, if necessary, so as to avoid any trouble of stirring due to the increased viscosity during the polymerization.

The average molecular weight (weight average molecular weight by polystyrene standard of GPC) of the aliphatic and aromatic polyamide-imide resin having a controlled molecular arrangement produced by the present invention is preferably 10,000 or higher, more preferably 20,000 or higher.

The present invention is now more particularly described with reference to the following examples which are for the purpose of illustration only and are intended to imply no limitation thereon.

The physical properties of polymers obtained in the working examples and comparison examples were measured by the following methods.

Average Molecular Weight

A polymer solution is diluted with N-methylpyrrolidone and a molecular weight distribution curve is prepared by means of GPC. By using the polystyrene standard, the average molecular weight is determined.

Flow Temperature

This is a temperature at which the apparent melt viscosity determined by using the flow tester (manufactured by Shimazu Seisakusho, Japan) is 10000 poise.

EXAMPLE 1

In a 500 ml. flask equipped with stirrer, thermometer, condenser and dropping funnel were placed, in a nitrogen atmosphere, 21.05 g (0.1096 mole) of benzene-1,2,4-tricarboxylic acid anhydride, 0.127 g (0.00219 mole) of potassium fluoride, 0.447 g (0.00302 mole) of phthalic anhydride, and 200 ml of N,N'-dimethylethylene urea and a solution was prepared.

Hexamethylene-1,6-diisocyanate 9.21 g (0.0548 mole) and tolylene-2,4-diisocyanate 9.54 g (0.0548 mole) were weighed and placed in the dropping funnel followed by adding the mixture to the flask at once.

The temperature of the resulting solution was raised to 200° C. with stirring, and it was observed that the reaction became vigorous at 130° C. and carbon dioxide was generated. While stirring was continued at 200° C. for one hour, the color of the solution changed to red brown from yellow, and the viscosity increased.

For a further one hour the heating was continued to effect aging and then the reaction solution was cooled to room temperature. The resulting polymer solution was added to water under high speed stirring to produce a polymer powder.

The resulting polymer powder was washed with water three times and finally washed with methanol followed by drying under reduced pressure at 150° C. for 8 hours to obtain 29 g of the polymer powder.

Molecular weight of the polymer thus obtained was 42,000. The glass transition temperature determined by means of DSC was 210° C., and the 5% decomposition temperature in air was as high as 440° C. Therefore, the heat resistance of the polymer was excellent. Furthermore, the flow temperature was 301° C. Therefore, the heat melting characteristics rendered the polymer injection moldable.

EXAMPLES 2–7

Aromatic tricarboxylic acid anhydrides, aliphatic or araliphatic diisocyanates, and aromatic diisocyanates were placed in an experiment apparatus as shown in Example 1 and the polymerization was carried out in a way similar to Example 1 under the conditions as shown in Table 1 (infra.). Physical properties of the resulting polymers are shown in Table 1.

EXAMPLE 8

In a 500 ml flask equipped with stirrer, thermometer, condenser, nitrogen gas inlet tube, distillation column, and dropping funnel were placed benzene-1,2,4-tricarboxylic acid anhydride 21.03 g (0.1095 mole), hexamethylene-1,6-diamine 6.35 g (0.05462 mole), potassium fluoride 0.133 g (0.00230 mole), phthalic anhydride 0.576 g (0.00389 mole), and 200 ml of N,N'-dimethylethylene urea in a nitrogen atmosphere, and the reaction was carried out at 200° C. for two hours while removing the condensation water thus formed.

The resulting reaction product fluid was cooled to 140° C., and then 9.55 g (0.05484 mole) of tolylene-2,4-diisocyanate was weighed, placed in the dropping funnel, and added to the flask at once. The temperature of the resulting solution was raised to 220° C. with stirring. The reaction became vigorous at 150° C. and generation of carbon dioxide was observed.

While the stirring was continued at 220° C. for one hour, the color of the solution changed from yellow to reddish brown and the viscosity increased. After heating was continued for a further one hour for aging, the reaction solution was cooled to room temperature and the resulting polymerization product fluid was put in water under high speed stirring to obtain a polymer powder.

The polymer powder was washed with water three times and finally washed with methanol followed by drying at 150° C. for 8 hours under reduced pressure to obtain 29 g of the polymer powder.

The average molecular weight of the resulting polymer was 31,000 and the glass transition temperature determined by means of DSC was 197° C.

The heat resistance was high such that the 5% decomposition temperature in air was 448° C. In addition, the flow temperature was 321° C. and therefore, the heat melting characteristic rendered the polymer injection moldable.

EXAMPLES 9–12

Polymerization was effected in an experimental apparatus described in Example 8 under the conditions of Example 8 except that the aromatic tricarboxylic acid anhydrides, aliphatic diamines, aromatic diisocyanates and materials as listed in Table 2 were used.

The physical properties of the resulting polymers are also shown in Table 2.

EXAMPLE 13

In the experimental apparatus described in Example 8, benzene-1,2,4-tricarboxylic acid anhydride and hexamethylene-1,6-diamine were reacted under conditions similar to Example 8. The resulting reaction product fluid was cooled and put in an aqueous solution of hydrochloric acid adjusted to pH 2 to isolate bis-[(4-carboxy)phthalimido]-1,6-hexamethylene. The melting point determined by means of DSC was 320° C. To this compound was added tolylene-2,4-diisocyanate and the polycondensation was carried out. Physical properties of the resulting polymer are shown in Table 2.

EXAMPLE 14

In a 500 ml flask equipped with stirrer, thermometer, condenser and dropping funnel were placed benzene-1,2,4-tricarboxylic acid anhydride 21.34 g (0.1111 mole), potassium fluoride 0.142 g (0.00244 mole), phthalic anhydride 0.549 g (0.00371 g), and N,N'-dimethylethylene urea 200 ml in a nitrogen atmosphere to form a solution, which was then heated to 140° C. with stirring.

Hexamethylene-1,6-diisocyanate (9.32 g, 0.05542 mole) was weighed and placed in the dropping funnel, and then added at once to the flask followed by reacting at 160° C. for 4 hours.

Further, 9.69 g (0.05565 mole) of tolylene-2,4-diisocyanate was weighed and placed in the dropping funnel, and then added at once to the flask. While the inner temperature of the flask was raised to 220° C., the reaction became vigorous at 150° C. and generation of carbon dioxide was observed.

While the stirring was continued at 220° C. for one hour, the color of the solution changed from yellow to reddish brown and the viscosity increased.

The heating was continued for a further one hour to effect aging and then cooled to room temperature. The polymerization product fluid was put in water under high speed stirring to obtain a polymer powder.

The polymer powder was washed with water further three times and finally washed with methanol followed by drying under reduced pressure at 150° C. for 8 hours to obtain 30 g of the polymer powder.

The average molecular weight of the resulting polymer was 33,000. The glass transition temperature determined by means of DSC was 201° C. The 5% decomposition temperature was as high as 449° C. and therefore the heat resistance was very good. In addition, the flow temperature was 329° C. so that the heat melting property renders the polymer injection moldable.

EXAMPLES 15–18

By using the experimental apparatus in Example 14 under the conditions of Example 14 except that aromatic tricarboxylic acid anhydrides, aliphatic or araliphatic diisocyanates, and aromatic diisocyanates listed in Table 3 were used under the conditions in Table 3, polymerizations were carried out.

Physical properties of the resulting polymers are shown in Table 3.

EXAMPLE 19

In the experimental apparatus described in Example 14 were placed benzene-1,2,4-tricarboxylic acid anhydride and hexamethylene-1,6-diisocyanate and the reaction was carried out under the same conditions as in Example 14.

The resulting reaction product fluid was cooled and added to an aqueous solution of hydrochloric acid adjusted to pH 2 and bis-[(4-carboxy)phthalimido]-1,6-hexamethylene was separated. The melting point was determined by means of DSC and was 320° C.

To this compound was added tolylene-2,4-diisocyanate to effect polycondensation. Physical properties of the resulting polymer are shown in Table 3.

REFERENCE EXAMPLE

To a four-necked flask equipped with stirrer, thermometer and condenser were added potassium fluoride 0.0174 g (0.0003 mole), benzoic acid (7.4713 g (0.0612 mole), and N,N'-dimethylethylene urea 109.84 g in a nitrogen atmosphere and a solution was formed.

After keeping the temperature constant, 4.9489 g (0.029 mole) of hexamethylene-1,6-diisocyanate was added at once to the flask. The consumed amount of hexamethylene-1,6-diisocyanate was quantitatively measured at each time by means of liquid chromatography and the reaction-rate constant k of the amidation was calculated at each temperature by integration.

In addition, the reaction-rate constant of the imidization at each temperature was measured in a similar manner to above by using phthalic anhydride, and the reaction-rate constant of the reaction with tolylene-2,4-diisocyanate was also measured in the same manner. The reaction-rate constants at each temperature are shown in Table 4.

TABLE 1

|  | Example 2 | Example 3 | Example 4 | Example 5 | Example 6 | Example 7 |
|---|---|---|---|---|---|---|
| Amount of aromatic tricarboxylic acid anhydride (g) | TMA 21.03 | TMA 21.02 | TMA 21.16 | TMA 21.13 | TMA 21.16 | TMA 21.19 |
| Amount of aliphatic or araliphatic diisocyanate (g) | HDI 3.68 | HDI 14.72 | HDI 7.41 | HDI 9.25 | BCHI 11.36 | HDI 9.28 |
| Amount of aromatic diisocyanate (g) | TDI 15.25 | TDI 3.81 | TDI 11.51 | MDI 13.76 | TDI 9.59 | DPEDI 13.91 |
| End blocking agent | PA | PA | BA | PA | PA | PA |
| Amount of end blocking agent (g) | 0.499 | 0.277 | 0.247 | 0.340 | 0.480 | 0.342 |
| Catalyst | $K_2CO_3$ | NaOH | KF | KF | KF | KF |
| Amount of catalyst (g) | 0.348 | 0.0963 | 0.141 | 0.128 | 0.147 | 0.141 |
| Solvent | NMP | DMI | DMI | DMI | sulfolane | DMI |
| Average molecular weight | 36,000 | 64,000 | 58,000 | 74,000 | 39,000 | 66,000 |
| Glass transition temperature (°C.) | 245 | 143 | 218 | 204 | 212 | 208 |
| 5% decomposition temperature (°C.) | 437 | 436 | 439 | 433 | 438 | 440 |
| Flowing temperature (°C.) | 319 | 270 | 306 | 295 | 299 | 300 |
| Yield (%) | 96 | 97 | 97 | 94 | 96 | 95 |

TMA: Benzene-1,2,4-tricarboxylic acid anhydride
HDI: Hexamethylene-1,6-diisocyanate
BCHI: 2,4-(or 2,5-) diisocyanatomethylbicyclo [2,2,1] heptane
TDI: Tolylene-2,4-diisocyanate
MDI: Diphenylmethane-4,4'-diisocyanate
DPEDI: Diphenylether-4,4'-diisocyanate
PA: Phthalic anhydride
BA: Benzoic acid
DMI: N,N'-dimethylethylene urea
NMP: N-methylpyrrolidone

TABLE 2

|  | Example 9 | Example 10 | Example 11 | Example 12 | Example 13 |
|---|---|---|---|---|---|
| Amount of aromatic tricarboxylic acid anhydride (g) | TMA 21.05 | TMA 21.23 | TMA 21.15 | TMA 21.21 | TMA 21.13 |
| Amount of aliphatic or araliphatic diamine (g) | HDA 6.34 | m-XDA 7.49 | HDA 6.41 | HDA 6.39 | HDA 6.38 |
| Amount of aromatic diisocyanate (g) | TDI 9.52 | TDI 9.60 | TDI 9.61 | TDI 9.56 | TDI 9.52 |
| End blocking agent | PA | PA | PA | PA | PA |
| Amount of end blocking agent (g) | 0.308 | 0.148 | 0.253 | 0.427 | 0.373 |
| Catalyst | KF | NaF | TMA-K | TMA-Na | KF |
| Amount of catalyst (g) | 0.128 | 0.0926 | 0.507 | 0.520 | 0.134 |
| Solvent | NMP | sulfolane | DMAc | DMI | DMI |
| Average molecular weight | 58,000 | 126,000 | 71,000 | 42,000 | 48,000 |
| Glass transition temperature (°C.) | 204 | 233 | 201 | 208 | 200 |
| 5% decomposition temperature (°C.) | 446 | 441 | 449 | 446 | 447 |
| Flowing temperature (°C.) | 335 | 355 | 343 | 329 | 332 |
| Yield (%) | 97 | 95 | 96 | 96 | 91 |

TMA: Benzene-1,2,4-tricarboxylic acid anhydride
HDA: Hexamethylene-1,6-diamine
m-XDA: m-Xylylenediamine
TDI: Tolylene-2,4-diisocyanate
PA: Phthalic anhydride
TMA-K: Potassium salt of benzene-1,2,4-tricarboxylic acid anhydride
TMA-Na: Sodium salt of benzene-1,2,4-tricarboxylic acid anhydride
DMI: N,N'-dimethylethylene urea
NMP: N-methylpyrrolidone
DMAc: N,N-dimethylacetamide

TABLE 3

|  | Example 15 | Example 16 | Example 17 | Example 18 | Example 19 |
| --- | --- | --- | --- | --- | --- |
| Amount of aromatic tricarboxylic acid anhydride (g) | TMA 22.01 | TMA 21.15 | TMA 21.27 | TMA 21.08 | TMA 21.42 |
| Amount of aliphatic or araliphatic diisocyanate (g) | m-XDI 10.08 | HDI 9.33 | HDI 9.46 | HDI 9.21 | HDI 9.38 |
| Amount of aromatic diisocyanate (g) | TDI 10.04 | TDI 9.64 | TDI 9.78 | TDI 9.55 | TDI 9.90 |
| End blocking agent | PA | PA | PA | PA | PA |
| Amount of end blocking agent (g) | 0.128 | 0.354 | 0.276 | 0.639 | 0.482 |
| Catalyst | KF | NaF | TMA-K | TMA-Na | KF |
| Amount of catalyst (g) | 0.140 | 0.102 | 0.535 | 0.517 | 0.136 |
| Solvent | NMP | sulfolane | DMAc | DMI | DMI |
| Average molecular weight | 152,000 | 51,000 | 66,000 | 28,000 | 38,000 |
| Glass transition temperature (°C.) | 234 | 202 | 203 | 199 | 202 |
| 5% decomposition temperature (°C.) | 440 | 446 | 445 | 448 | 449 |
| Flowing temperature (°C.) | 357 | 331 | 334 | 328 | 335 |
| Yield (%) | 97 | 96 | 95 | 96 | 97 |

TMA: Benzene-1,2,4-tricarboxylic acid anhydride
HDI: Hexamethylene-1,6-diisocyanate
m-XDI: m-Xylylene diisocyanate
TDI: Tolylene-2,4-diisocyanate
PA: Phthalic anhydride
TMA-K: Potassium salt of benzene-1,2,4-tricarboxylic acid anhydride
TMA-Na: Sodium salt of benzene-1,2,4-tricarboxylic acid anhydride
DMI: N,N'-dimethylethylene urea
NMP: N-methylpyrrolidone
DMAc: N,N-dimethylacetamide

TABLE 4

| | Reaction-rate constant k(min$^{-1}$) | | | |
| --- | --- | --- | --- | --- |
| | Hexamethylene-1,6-diisocyanate | | Tolylene-2,4-diisocyanate | |
| Temperature (°C.) | Amidation | Imidization | Amidation | Imidization |
| 140 | (0.001) | 0.030 | 1.50 | 1.26 |
| 180 | 0.007 | 0.138 | (4.55) | 18.42 |
| 210 | 0.025 | 0.382 | (9.52) | (29.86) |

The value in the parentheses is a value calculated from the Arrhenius plot.

COMPARISON EXAMPLE 1

In a 1000 ml. flask equipped with stirrer, thermometer, condenser, and dropping funnel were placed benzene-1,2,4-tricarboxylic acid anhydride 63.66 g (0.3314 mole), potassium fluoride 0.19 g (0.0033 mole), and N,N'-dimethylethylene urea 600 ml in a nitrogen atmosphere and a solution was prepared.

Hexamethylene-1,6-diisocyanate 55.18 g (0.3281 mole) was weighed and placed in the dropping funnel, and then added to the flask at once.

The resulting solution was heated to 200° C. with stirring. When the temperature was raised to 130° C., the reaction became vigorous and generation of carbon dioxide was observed. When stirring was continued at 200° C. for one hour, the color of the solution changed from yellow to reddish brown and the viscosity increased. The heating was continued for a further one hour for aging and then the solution was cooled to room temperature. The polymerization fluid was put in water with high speed stirring to obtain a polymer powder.

The powder thus obtained was washed with water three times, finally washed with methanol, and dried under reduced pressure at 150° C. for 8 hours to produce 85 g of a polymer powder.

Average molecular weight of this polymer was 23,000 and the glass transition temperature thereof was as low as 115° C., and therefore, this polymer did not have a sufficient heat resistance to be a heat resistant resin.

COMPARISON EXAMPLE 2

The reaction and the post-treatment of Comparison Example 1 were repeated except that tolylene-2,4-diisocyanate 57.14 g (0.3281 mole) and potassium carbonate 0.46 g (0.0033 mole) were used in place of the diisocyanate and the catalyst, and a polymer was produced which had average molecular weight of 56,000, glass transition temperature of 343° C., 5% decomposition temperature of 427° C. and flow temperature of 392° C.

This polymer had only a small temperature difference between the flow temperature and the heat decomposition temperature and was not suitable for melt molding.

COMPARISON EXAMPLE 3

The polymerization procedure and the post-treatment of Comparison Example 1 were repeated except that benzene-1,2,4-tricarboxylic acid anhydride 52.12 g (0.2713 mole), diphenylmethane-4,4'-diisocyanate 67.21 g (0.2685 mole) and potassium fluoride 0.16 g (0.0027 mole) were used. The resulting polymer had average molecular weight of 52,000, glass transition temperature of 337° C., 5% decomposition temperature of 421° C., and flow temperature of 387° C. This polymer had only a small temperature difference between the flow temperature and the heat decomposition temperature so that it was not suitable for melt molding.

COMPARISON EXAMPLE 4

The reaction procedure of Comparison Example 1 was repeated except that benzene-1,2,4-tricarboxylic acid anhydride 57.31 g (0.2983 mole), naphthalene-1,5-diisocyanate 57.93 g (0.2756 mole), and sodium hydroxide 0.12 g (0.0030 mole) were used. The reaction was effected at 200° C. for 30 min. and a polymer powder precipitated.

The resulting polymer powder was further treated by filtration and washing. The powder was not soluble in N-methylpyrrolidone. The 5% decomposition temperature of this powder was 350° C. and therefore, the heat resistance was not sufficient for melt molding.

COMPARISON EXAMPLE 5

In a 500 ml flask equipped with stirrer, thermometer, condenser, nitrogen gas inlet tube, distillation column and dropping funnel were placed benzene 1,2,4-tricarboxylic acid anhydride 21.25 g (0.1106 mole), diphenylmethane-4,4'-diamine 16.45 g (0.08295 mole), acetic anhydride 0.44 g (0.1106 mole), and N,N'-dimethylethylene urea 170 ml in a nitrogen atmosphere, and the reaction was carried out for two hours while the water of condensation was removed from the system.

Hexamethylene-1,6-diamine 3.21 g (0.1106 mole) and N,N'-dimethylethylene urea 30 ml was weighed and added to the flask at once. The temperature of the resulting solution was raised to 225° C. with stirring and heating and distillation were continued for 2 hours, and a post-treatment was effected in the same manner as in Comparison Example 1.

Average molecular weight of the resulting polymer was 4800. That is, a high molecular weight polymer could not be obtained.

COMPARISON EXAMPLE 6

In a 500 ml flask equipped with stirrer, thermometer, condenser, nitrogen gas inlet tube, distillation column and dropping funnel were placed m-phenylene-diamine 32.4 g (0.30 mole), N,N-dimethylacetamide 60 ml, acetic anhydride 20.4 g (0.20 mole), and benzene-1,2,4-tricarboxylic acid anhydride 78.6 g (0.40 mole) in a nitrogen atmosphere, and a solution was obtained.

Acetic anhydride 20.4 g (0.20 mole), hexamethylene-1,6-diamine 11.6 g (0.10 mole), and N,N-dimethylacetamide 20 ml were weighed and added to the flask at once.

Then the flask was heated to 330° C. and the reaction was carried out for two hours at atmospheric pressure and then for two hours at reduced pressure while recovering the distillate.

Average molecular weight of the resulting polymer was 7200 and therefore, a high molecular weight polymer could not be obtained.

The 5% decomposition temperature was as low as 354° C. and therefore, the polymer did not have enough heat resistance to be a heat resistant resin.

What is claimed is:

1. A melt moldable polyamide-imide resin consisting essentially of 5-95 mole % of a structural unit of the formula (I - 1),

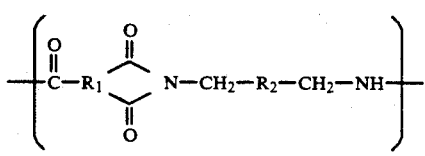

where $R_1$ is a trivalent aromatic ring of which two valence positions are at vicinal carbon atoms of the ring, $R_2$ is a direct bond or a divalent group containing at least one carbon atom, and 95-5 mole % of a structural unit of the formula (II),

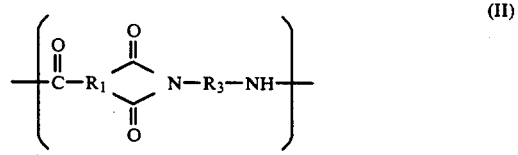

where $R_1$ is a trivalent aromatic ring of which two valence positions are at vicinal carbon atoms of the ring, and $R_3$ is a divalent aromatic group, the structural units of formula (I - 1) and formula (II) being bonded at random, the ends of the polymer molecule being blocked with a member selected from the group consisting of unsubstituted aromatic groups and aromatic groups which are substituted with a group not reactive with amines, isocyanates, carboxylic acids and dicarboxylic acid anhydrides, and the glass transition temperature of said resin being 120°-300° C.

2. A melt moldable polyamide-imide resin consisting essentially of a repeating unit of a controlled molecular arrangement of the formula (I - 2),

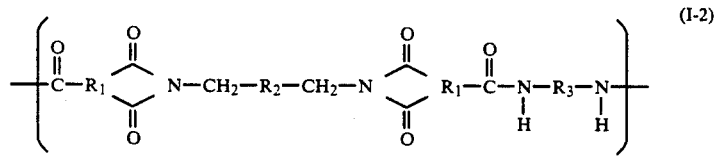

where $R_1$ is a trivalent aromatic ring of which two valence positions are at vicinal carbon atoms of the ring, $R_2$ is a direct bond or a divalent group containing at least one carbon atom, and $R_3$ is a divalent aromatic group, the ends of the polymer molecule being blocked with a member selected from the group consisting of unsubstituted aromatic groups and aromatic groups which are substituted with a group not reactive with amines, isocyanates, carboxylic acids and dicarboxylic acid anhydrides, and the glass transition temperature of said resin being 120°-300° C.

3. The melt moldable polyamide-imide resin according to claim 1 or 2 in which $R_1$ in each of formulas (I - 1), (I - 2), and (II) is a trivalent group selected from the group consisting of

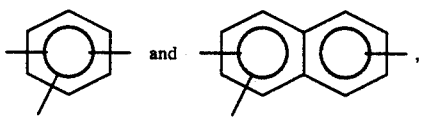

4. The melt moldable polyamide-imide resin according to claim 1 or 2 in which $R_2$ in each of formulas (I - 1) and (I - 2) is a direct bond or a divalent group selected from the group consisting of

where n is an integer of 0-10.

5. The melt moldable polyamide-imide resin according to claim 1 or 2 in which R₃ in each of formulas (I - 2) and (II) is a divalent group selected from the group consisting of

where X is a direct bond or a member selected from the group consisting of —CH₂—, —SO₂—, —SO—, —S—, —O—, and —CO—, and

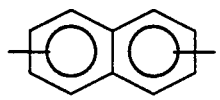

6. The melt moldable polyamide-imide resin according to claim 1 or 2 in which the group blocking the ends of the polymer molecule is an aromatic group derived from a member selected from the group consisting of unsubstituted aromatic dicarboxylic acid anhydrides; aromatic dicarboxylic acid anhydrides substituted with a group not reactive with amines, isocyanates, carboxylic acids and dicarboxylic acid anhydrides; unsubstituted aromatic monocarboxylic acids; and aromatic monocarboxylic acids substituted with a group not reactive with amines, isocyanates, carboxylic acids and dicarboxylic acid anhydrides.

7. The melt moldable polyamide-imide resin according to claim 1 or 2 in which the group blocking the ends of the polymer molecule is a group derived from a member selected from the group consisting of

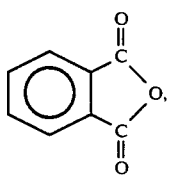

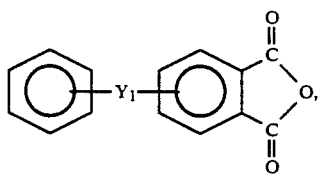

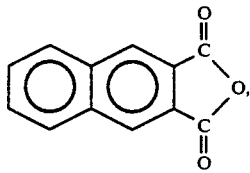

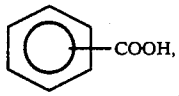

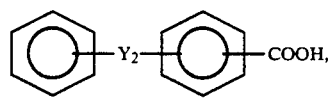

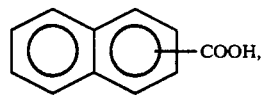

and the above-mentioned compounds substituted with a group not reactive with amines, isocyanates, carboxylic acids and dicarboxylic acid anhydrides, where Y₁ is a direct bond or a member selected from the group consisting of —CH₂—, —SO₂—, —SO—, —S—, —O—, and —CO—, and where Y₂ is a direct bond or a member selected from the group consisting of —CH₂—, —SO₂—, —SO—, —S—, —O—, and —CO—.

8. The melt moldable polyamide-imide resin according to claim 1 or 2 in which the group blocking the ends of the polymer molecule is a group derived from a member selected from the group consisting of phthalic anhydride and benzoic acid.

9. A process for the production of a melt moldable polyamide-imide resin comprising 5–95 mole % of a structural unit of the formula (I - 1);

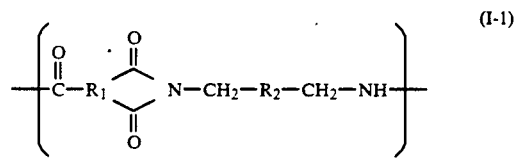

where R₁ is a trivalent aromatic ring of which two valence positions are at vicinal carbon atoms of the ring; R₂ is a direct bond or a divalent group containing at least one carbon atom; and 95–5 mole % of a structural unit of the formula (II);

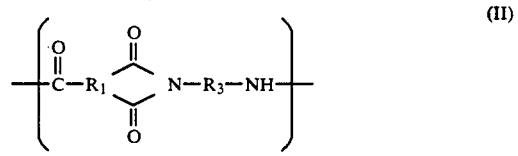

where R₁ is a trivalent aromatic ring of which two valence positions are at vicinal carbon atoms of the ring; and R₃ is a divalent aromatic group; the structural units of formula (I - 1) and formula (II) being bonded at random; the ends of the polymer molecule being blocked with a member selected from the group consisting of unsubstituted aromatic groups and aromatic groups which are substituted with a group not reactive with amines, isocyanates, carboxylic acids and dicarboxylic acid anhydrides; and the glass transition temperature of said resin being 120°–300° C.; which comprises reacting an aromatic tricarboxylic acid anhydride of the formula (III);

where $R_1$ is a trivalent aromatic ring of which two valence positions are at vicinal carbon atoms of the ring; an aliphatic or araliphatic diisocyanate of the formula (IV);

$$OCN-CH_2-R_2-CH_2NCO \qquad (IV)$$

where $R_2$ is a direct bond or a divalent group containing at least one carbon atom; and an aromatic diisocyanate of the formula (V);

$$OCN-R_3-NCO \qquad (V)$$

where $R_3$ is a divalent aromatic group; the molar amount of the aliphatic or araliphatic diisocyanate of the formula (IV) being 5-95 mole % based on the total molar amount of the aliphatic or araliphatic diisocyanate of the formula (IV) and the aromatic diisocyanate of the formula (V); and at least one end blocking agent selected from the group consisting of unsubstituted aromatic dicarboxylic acid anhydrides; aromatic dicarboxylic acid anhydrides substituted with a group not reactive with amines, isocyanates, carboxylic acids and dicarboxylic acid anhydrides; unsubstituted aromatic monocarboxylic acids; and aromatic monocarboxylic acids substituted with a group not reactive with amines, isocyanates, carboxylic acids and dicarboxylic acid anhydrides in an amount of 0.1 mole or less based on 1 mole of the aromatic tricarboxylic acid anhydride of the formula (III) in the presence of an alkali metal compound as a catalyst in a dipolar aprotic solvent at a temperature of 180° C. or higher.

10. A process for the production of a melt moldable polyamide-imide resin comprising a repeating unit of a controlled molecular arrangement of the formula (I - 2);

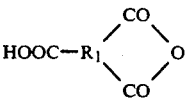

where $R_1$ is a trivalent aromatic ring of which two valence positions are at vicinal carbon atoms of the ring; 0.475-0.525 mole of an aliphatic or araliphatic diamine of the formula (VI);

$$H_2N-CH_2-R_2-CH_2-NH_2 \qquad (VI)$$

where $R_2$ is direct bond or a divalent group containing at least one carbon atom; and 0.1 mole or less of at least one end blocking agent selected from group consisting of unsubstituted aromatic dicarboxylic acid anhydrides; aromatic dicarboxylic acid anhydrides substituted with a group not reactive with amines, isocyanates, carboxylic acids and dicarboxylic acid anhydrides; unsubstituted aromatic monocarboxylic acids; and aromatic monocarboxylic acids substituted with a group not reactive with amines, isocyanates, carboxylic acids and dicarboxylic acid anhydrides; based on 1 mole of the aromatic tricarboxylic acid anhydride of the formula (III) in the presence of an alkali metal compound as a catalyst in a dipolar aprotic solvent at a temperature of 100° C. or higher; removing the water of condensation; then adding to the system 0.475-0.525 mole of an aromatic diisocyanate of the formula (V);

$$OCN-R_3-NCO \qquad (V)$$

where $R_3$ is a divalent aromatic group and effecting the reaction at a temperature of 150° C. or higher.

11. A process for the production of a melt moldable (I-2)

where $R_1$ is a trivalent aromatic ring of which two valence positions are at vicinal carbon atoms of the ring; $R_2$ is a direct bond or a divalent group containing at least one carbon atoms; and $R_3$ is a divalent aromatic group; the ends of the polymer molecule being blocked with a member selected from the group consisting of unsubstituted aromatic groups and aromatic groups which are substituted with a group not reactive with amines, isocyanates, carboxylic acids and dicarboxylic acid anhydrides; and the glass transition temperature of said resin being 120°-300° C. which comprises reacting one mole of an aromatic tricarboxylic acid anhydride of the formula (III);

polyamide-imide resin which comprises a repeating unit of a controlled molecular arrangement of the formula (I - 2);

(I-2)

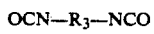

where $R_1$ is a trivalent aromatic ring of which two valence positions are at vicinal carbon atoms of the ring; $R_2$ is a direct bond or a divalent group containing at least one carbon atom; and $R_3$ is a divalent aromatic group; the ends of the polymer molecule being blocked with a member selected from the group consisting of unsubstituted aromatic groups and aromatic groups which are substituted with a group not reactive with amines, isocyanates, carboxylic acids and dicarboxylic acid anhydrides; and the glass transition temperature of said resin being 120°-300° C. which comprises reacting one mole of an aromatic tricarboxylic acid anhydride of the formula (III);

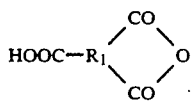  (III)

where $R_1$ is a trivalent aromatic ring of which two valence positions are at vicinal carbon atoms of the ring; 0.475–0.525 mole of an aliphatic or araliphatic diisocyanate of the formula (IV);

$$OCN-CH_2-R_2-CH_2NCO \quad (IV)$$

where $R_2$ is a direct bond or a divalent group containing at least one carbon atom and 0.1 mole or less of at least one end blocking agent selected from the group consisting of unsubstituted aromatic dicarboxylic acid anhydrides; aromatic dicarboxylic acid anhydrides substituted with a group not reactive with amines, isocyanates, carboxylic acids and dicarboxylic acid anhydrides; unsubstituted aromatic monocarboxylic acids; and aromatic monocarboxylic acids substituted with a group not reactive with amines, isocyanates, carboxylic acids and dicarboxylic acid anhydrides; based on 1 mole of the aromatic tricarboxylic acid anhydride, of the formula (III), in the presence of an alkali metal compound as a catalyst in a dipolar aprotic solvent at a temperature of 100° C. or higher; then adding to the reaction product 0.475–0.525 mole of an aromatic diisocyanate of the formula (V);

$$OCN-R_3-NCO \quad (V)$$

where $R_3$ is a divalent aromatic group and effecting the reaction at a temperature of 150° C. or higher.

12. The process according to any one of claim 9–11 in which the end blocking agent is a member selected from the group consisting of

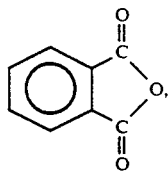

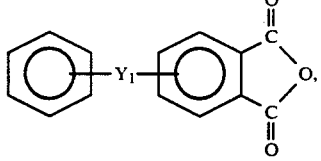

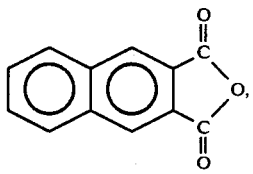

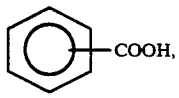

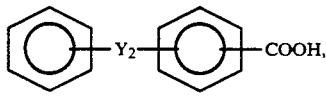

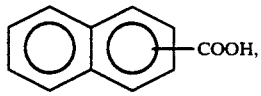

and the above-mentioned compounds substituted with a group not reactive with amines, isocyanates, carboxylic acids and dicarboxylic acid anhydrides, where $Y_1$ and $Y_2$ are, similar or dissimilar, a direct bond or a member selected from the group consisting of $-CH_2-$, $-SO_2-$, $-SO-$, $-S-$, $-O-$ and $-CO-$.

13. The process according to any one of claim 9–11 in which the end blocking agent is a member selected from the group consisting of phthalic anhydride and benzoic acid.

14. The process according to any one of claim 9–11 in which the alkali metal compound is at least one member selected from the group consisting of alkali metal salts of polybasic carboxylic acids, alkali metal carbonates, alkali metal hydrogen carbonates, alkali metal hydroxides, and alkali metal fluorides.

15. The process according to any one of claim 9–11 in which the dipolar aprotic solvent is at least one member selected from the group consisting of amides, phosphoryl amides, sulfones, sulfoxides and ureas.

* * * * *